(12) United States Patent
Glukhih et al.

(10) Patent No.: US 11,614,185 B2
(45) Date of Patent: Mar. 28, 2023

(54) THREADED JOINT FOR OILFIELD PIPES

(71) Applicant: JOINT STOCK COMPANY "PERVOURALSK PIPE PLANT" (JSC "PNTZ"), Sverdlovskaya obl. (RU)

(72) Inventors: Nikita Evgenyevich Glukhih, Pervouralsk (RU); Sergey Nikolaevich Barabanov, Snezhinsk (RU); Artem Vladimirovich Zaboyarkin, Pervouralsk (RU); Sergei Vladimirovich Alexandrov, Pervouralsk (RU); Vladislav Vladimirovich Golovin, Chelyabinsk (RU); Vasily Alexandrovich Morgunov, Pervouralsk (RU); Catalin Teodoriu, Clausthal-Zelelrfeld (DE); Javier Holzmann, Berdasco, Goslar (DE); Robert Van Helvoirt, Den Bosch (NL)

(73) Assignee: JOINT STOCK COMPANY "PERVOURALSK PIPE PLANT" (JSC "PNTZ"), Sverdlovskaya obl. (RU)

( * ) Notice: Subject to any disclaimer, the term of this patent is extended or adjusted under 35 U.S.C. 154(b) by 310 days.

(21) Appl. No.: 16/764,259

(22) PCT Filed: Nov. 7, 2018

(86) PCT No.: PCT/RU2018/000726
§ 371 (c)(1),
(2) Date: May 14, 2020

(87) PCT Pub. No.: WO2019/098882
PCT Pub. Date: May 23, 2019

(65) Prior Publication Data
US 2020/0370683 A1 Nov. 26, 2020

(30) Foreign Application Priority Data
Nov. 14, 2017 (RU) .......................... RU2017139582

(51) Int. Cl.
*F16L 15/06* (2006.01)
*E21B 17/042* (2006.01)
*F16L 15/00* (2006.01)

(52) U.S. Cl.
CPC ............ *F16L 15/06* (2013.01); *E21B 17/042* (2013.01); *F16L 15/002* (2013.01)

(58) Field of Classification Search
CPC ...... F16L 15/004; F16L 15/009; E21B 17/042
See application file for complete search history.

(56) References Cited

U.S. PATENT DOCUMENTS

| 3,224,799 | A | * | 12/1965 | Blose | F16L 15/004 285/334 |
| 4,384,737 | A | * | 5/1983 | Reusser | F16L 15/004 285/369 |
| 4,540,200 | A | * | 9/1985 | Larsson | E21B 17/042 175/320 |
| 8,882,157 | B2 | | 11/2014 | Chelette et al. | |
| 8,894,101 | B2 | * | 11/2014 | Pallini, Jr. | F16L 15/004 285/333 |
| 10,428,594 | B2 | * | 10/2019 | Zhu | F16L 15/004 |
| 2010/0283239 | A1 | * | 11/2010 | Gillot | F16L 15/004 285/332.3 |

FOREIGN PATENT DOCUMENTS

DE 4446806 C1 5/1996
RU 2604461 C1 12/2016
(Continued)

OTHER PUBLICATIONS

International Search Report issued in respect of the International Patent Application PCT/RU2018/000726, dated Mar. 7, 2019.

*Primary Examiner* — David Bochna
(74) *Attorney, Agent, or Firm* — BCF LLP

(57) ABSTRACT

A threaded joint for casing pipes and production pipes has a threaded portion, and a metal-metal type sealing assembly structure in the form of a combination of sealing elements (Continued)

which provide 100% effective functioning of the joint under compression and tension, inter alia under the effect of internal and external fluid pressure, by observing the size ratio criteria of a ball-and-cone type seal, in which a radial sealing surface has two consecutively arranged toroidal surfaces which, in the event of axial contact between flanges, form, together with a mating sealing surface of a female member, two seals which remain tight under any combination of loads. The technical result of the group of inventions is an increase in the reliability of the threaded joint under the effect of static and variable operating loads, including external pressure, compression, twisting, and combined loads during the bending and turning of a pipe string, wherein the pipes can be used in the construction of wells having a degree of deviation of up to 13°/10 m.

9 Claims, 5 Drawing Sheets

(56) References Cited

FOREIGN PATENT DOCUMENTS

| WO | 2004109173 A1 | 12/2004 |
|----|---------------|---------|
| WO | 2009060729 A1 | 5/2009  |
| WO | 2012003645 A1 | 1/2012  |

* cited by examiner

THREADED JOINT FOR OILFIELD PIPES

CROSS-REFERENCE

The present application is a National Phase Entry of a PCT application No.: RU2108/000726 filed on Nov. 7, 2018, which claims priority to a Russian patent application No.: 2017139582 filed on Nov. 14, 2017, the content of which is incorporated by reference in its entirety.

FIELD

The group of inventions belongs to threaded joints of steel casing and tubing strings with a metal-to-metal seal intended to fasten the wall of the completed well for oil, gas, gas condensate production or injection of drilling fluids into ground formations.

BACKGROUND

The consumers (oil and gas producers) and manufacturers (pipe companies) named such threaded joints Premium joints. These threaded joints are very tight and extremely reliable under repeated combined loads resulting from the operation of pipes in wells. At the same time, pipes and threaded joints are subject to high requirements for operational reliability, for example:
  in directional (radial) wells or horizontal wells, the pipes are continuously bent, which results in increased bending stress on the body and the threaded joint;
  the pipe sustains marginal internal and external fluid pressure (underground water and oil formations under high pressure) or movable geological structures, axial compressive loads on the pipe body and the threaded joint when running, as well as a combination of these and other loads;
  pipe operation in multiple compression-tension cycles, such as cyclic steam stimulation.

SUMMARY

The processing complexity of the fields under development is constantly increasing and, consequently, the conditions for construction and operation of pipes in wells are becoming more stringent. Therefore, the requirements for Premium threaded joints are becoming more varied and more stringent, and with the gradual rise in demand for such pipes, it is crucial to ensure their stable quality and reliability, reducing their cost and ensuring the possibility of mass production.

Most inventions in this field are aimed at the threaded joint to ensure the structural strength of the pipe string and the necessary margin of tightness at static and serial alternating stress corresponding to 80-100% equivalent of the von Mises limit stress along the pipe body, and to allow the threaded joints to disassemble the string with the possibility of reuse.

The most common threaded joints of the 80-90s provided 100% tensile and internal pressure efficiency but had low compression strength and resistance to external pressure. The reasons for low compression strength are certain design constraints, namely: the thickness of the end section, the so-called shoulder, containing the metal-to-metal seal, does not exceed 50-60% of the thickness of the pipe wall. In this case, when the compressive force is applied to the threaded joint, it is almost entirely transferred to the end surface of the above-mentioned shoulder, which leads to plastic deformations, displacement of the pin nose to the pipe axis and opening of the metal-to-metal seal (i.e. loss of tightness).

The reason for low resistance to external (outer) pressure is the low radial stiffness of the pin at the seal location, as this leads to low compression strength of the pin nose under external pressure. When the external fluid penetrates through the thread gaps between the thread and the seal, the contact pressure decreases due to compression of the pin, and, with further increase in external pressure, the seal cannot prevent the external fluid from penetrating.

Analysis of the data of the scientific and technical literature and the authors' own research show that the tightness of the threaded joint to external pressure and the compressive strength can be increased by thickening the pin. For this purpose, a small end section of the pipe is often reduced (run-in) before cutting the pipe, i.e. the diameter of the pipe end is reduced. Even a small reduction in the inner diameter of the pipe is enough to increase the thickness of the nose. Besides, such reduction does not further complicate the operation of the pipe (it does not interfere with the necessary process operations inside the pipe when developing the wells), and also in case of the tubing string, it does not significantly reduce the bore leaving hydrodynamic parameters of the movement of the pumped fluid unchanged.

This description employs terms specific to this art, both in the design and manufacture of metal-to-metal sealed threaded joints. For example, when making a seal with an arc in the section (of any radius), this element (female or male member) will have a toroidal surface on the solid of revolution. Nonetheless, the such an element will be referred to as "ball". The authors propose to use the following terms in further disclosure of their invention:
  the term "toroidal surface" where it is necessary to explain the geometrical characteristics, properties and behavior of a given element;
  the term "ball" where it is necessary to describe the operation (action) of this element.

Such dual use of the term is similar to the simultaneous use of "end seal" and "shoulder" terms in individual patents and the technical literature on the threaded joints under consideration, still allowing specialists in this art to understand what it refers to.

The analysis of existing problems conducted by the authors made it possible to identify some of the most significant among them, which, according to the authors, should work together to ensure a technical result:
  ensuring the operability of the threaded joint nose under various combined loads without losing the important ability—tightness;
  ensuring sufficient load-bearing capacity of the threaded joint (i.e. the ability of the thread to withstand design loads under tension and compression) without losing its properties during multiple screwing and unscrewing operations;
  ensuring the operability of the threaded joint nose under cyclic compressive and tensile loads without critical changes in the geometry of the contact surfaces.

For example, a method for increasing the external pressure resistance and compression strength of a Premium connection by increasing the radial stiffness of the pin at the seal location and the accompanying increase in the radial size of the stop face is described in publication WO 2004/109173 (also published as EA008078). According to this invention, the seal is located near the threaded portion, and there is a shoulder between the seal and the face end. It has such a shape that there is a gap between its outer surface and a box formed by boring the box. To estimate radial stiffness, it can be assumed that it is proportional to the cross-sectional area of the pipe resting on the contact surface. A thickened shoulder allows increasing this area, and boring of the box allows designing a shoulder with a shape that ensures the maximum contact surface of the face end. At the same time, the authors of the said technical solution in patent document WO 2004/109173 (EA008078) show that even with a thick shoulder, the simultaneous application of a strong compression force and external pressure may lead to depressurization.

Authors of technical solutions described in DE4446806 and WO 2009/060729 (also published as EA017155) or, for example, U.S. Pat. No. 8,882,157 and WO 2012/003645, point to the uneven deformation of the long shoulder when the threaded joint is exposed to excessive screwing torque or high compressive force as a cause of depressurization of the Premium type threaded joint (in particular in the invention WO 2004/109173). From publicly available sources on this problem, it is known that if a threaded joint contains an axial stop (end seal—shoulder), the plane of which is located at an inverse (reverse) angle to the plane perpendicular to the joint axis, then during assembly of the joint, a radial force acts on the pin shoulder. This force may cause the additional pre-compression of the sealing surface of the pin against the mating sealing surface of the box, which improves sealing. However, if there is a large distance between the seal and the axial stop (shoulder), it is necessary to consider the possibility of the pin nose bending elastically in the non-contact zone between the seal and the shoulder. In this case, a complex deformation of the nose can cause the contact pressure in the seal to rise or fall, depending on the specific nose design.

To overcome this phenomenon, the technical solutions according to patents DE4446806 and WO 2009/060729 introduced an additional tight fit between the main seal and the face end due to the fact that the male member is made with an additional curved surface. An auxiliary seal (formed in contact between curved and tapered surfaces) limits the movement of the pin nose outwards and also ensures the centering and stabilization of the main seal under combined loads. However, in both designs considered, the auxiliary seal only has the function of centering and stabilizing the joint, since there are load combinations in which a gap may occur between the outer and inner seating surfaces in the given seal and the analyzed tight fit stops acting as a seal.

To maintain the tightness of the threaded joint under any loads, the technical solution according to patent DE4446806 attempts to solve the problem of maintaining the tightness and operability of the threaded joint by increasing the tension—i.e. the geometrical overlap between the surfaces of the inner male member (e.g. pipe) and the outer female member (e.g. box). The authors of DE4446806 proposed to place the additional seal close to the end of the pin and to provide the make the value of the radial tension of this seal minimum 1.15 times and maximum 1.3 times higher than the tension of the main seal. This is to ensure sufficient contact pressure in the auxiliary seal at a moderate contact pressure on the main seal. However, since the radial stiffness near the end face is significantly lower than the radial stiffness under the main seal, the contact pressure in the protective seal is insufficient for a number of loads to ensure tightness. Besides, an extensive tension in the auxiliary protective seal can "turn it off" under the sequential action of a combination of high compressive load with external pressure and the combination of tension with internal pressure due to plastic deformation directly at the end of the pin—i.e. this auxiliary protective no longer performs its role. If the plastic compression of the pin under this protective seal results in a gap for at least one of the load combinations, the protective seal will not perform a centering and stabilizing role for this load combination. Also, patent document DE4446806 recommends that long distances be set from the shoulder to the protective section, from the protective section to the sealing surface and from the sealing surface to the thread, with the end section being long enough so that it is impossible to achieve high compression strength due to the small radial size of the end face.

In publication WO 2009/060729 (also published as EA017155), the protective function is performed by an additional radial-axial shoulder (inclination angle of 5-30° to the joint axis, from +60 to +85° in relation to the plane perpendicular to the joint axis) adjacent to the surface of the main shoulder with an inverse angle. The diametrical tension for the surfaces of the additional shoulders is max. 1.1 of the tension of the main seal and preferably equal to that of the main seal. When such tension is chosen, there is no contact in the additional shoulder in the state of forced assembly. When assembling the joint, due to the interaction of the pin and the box in the main seal, the entire end portion of the pin, including the surface of additional shoulders in the pin, will shift inwards (shrinking in diameter) by an amount greater than or equal to the tension in the main seal, so that no contact will occur between the surfaces of the additional shoulders in the pin and the box. However, combined loads allow for this contact due to the special arrangement of the surface of additional pin and box shoulders. The occurrence of the contact ensures that the outward radial deformation of the pin nose end is limited. This eliminates the negative effect of the nose bending under compressive load or excessive make-up torque, resulting in a lower contact pressure in the main seal. The system made up of the main shoulder and an additional shoulder works as a tongue and groove connection, rigidly fixing the radial position of the pin relative to the box. However, in this case, the threaded joint has additional requirements for accuracy, characterizing the tension ratio of the main seal and the additional shoulder, which increases the cost of producing the joint and increases the required range and accuracy of control. Also when external pressure is applied to such a joint, at which the pin and box are compressed together, too rigid fixing of the pin nose in the coupling can lead to plastic compression of the pin nose, which in turn can lead to a loss of tightness of the joint while applying a strong compression force and external pressure during the subsequent combined application of tensile force and internal pressure. A similar situation may occur with a consecutive bending action and a combination of tension and internal pressure, where the joint remains tight under the bending action but loses its tightness when the bending action and extensive tension combined with excessive internal pressure are removed.

The above technical solutions according to patent specifications DE4446806 and WO 2009/060729 (also published as EA017155) are the closest equivalents of the proposed technical solution. The patent DE4446806 deals with a combination of two ball-and-cone type seals, while the seal closest to the end face may lose its tightness due to plastic deformations under the cyclic action of opposite combinations of loads. Solution WO 2009/060729 describes a combination of a seal and an extra shoulder but indicates the possibility of using a ball or other curved surface as one of the seal contact surfaces and a ball or other curved surface as one of the extra shoulder contact surfaces as optional, additional and replacement features.

In both solutions, the improvement of the sealing properties of a thread-side seal on a nose with a high radial stiffness is achieved by introducing an additional force fit between the main seal and the shoulder, which limits the radial movement of the pin nose outwards to a larger diameter. In the case of invention DE4446806, the given element in a forced assembly condition is overtightened, in the case of invention WO 2009/060729, the given element in a forced assembly condition of the joint is undertightened. Here "overtightened" means that contact pressure in the protective element results in an increased radial compression of the pin nose and strong unloading of the main seal, "undertightened" means that the tension in the main seal in the forced assembly condition causes a sharp drop in contact pressure in the additional force fit, up to developing a gap.

As a result, threaded joints both under patent DE4446806 and under publication WO 2009/060729 may have insufficient tightness characteristics for high compression and high external pressure/high tension and high internal pressure cycles. "Extensive" means marginal: up to 5% less than the declared performance for this type of load: the leak tightness test for alternating internal/external pressure, combined with 100% tensile and compressive loads is now included in ISO 13679 (or API 5C5) qualification test procedure for "A" series threaded joint and is referred to as "Q1-Q3 cycles", i.e. alternating application of limit loads from the first and third quadrants of the VME circle for the threaded joint.

Based on the above, it should be concluded that various researchers have attempted to create a sealing unit for a Premium threaded joint, which includes two metal-to-metal seals. However, in known technical solutions, the second, additional, seal plays an auxiliary role and does not ensure tightness in the whole range of operating loads.

Designing a sealing unit with two metal-to-metal seals, in which both seals remain tight under all possible combinations of loads, allows improving tightness and increasing the reliability of Premium-class threaded joints.

The maximum possible tightness means that the joint makes the best use of the radial stiffness created by the pin nose. Indeed, there is a certain level of nose compression, beyond which the deformations cease to be elastic. Accordingly, there is a maximum tightness that can be achieved for a given nose design. However, the maximum tightness cannot be physically achieved due to uneven nose compression. The highest characteristics correspond to the maximum permissible level in the elastic deformation area of the pin nose.

Increased reliability means that the joint ensures tightness already in the lower area of the permissible elastic radial tension in the sealing unit, that is, the joint, which is undertensioned by the seal, retains tightness for high repetitive combined loads. A further increase in radial tension while maintaining the operation of the pipe and box material in the elastic area increases the tightness margin and reliability of the joint.

Thus, the proposed group of inventions—versions of the Premium-class threaded joint for steel pipes—solves a technical problem of ensuring the maximum possible tightness and increased reliability under a wide range of operating loads, including bending, compressive, combined and cyclic loads, and results in preserving its performance characteristics after repeated assembly and disassembly operations.

The technical solution according to patent DE4446806 was chosen as a prototype for two inventions from the group.

The essence of the first version is as follows.

A threaded joint for oilfield pipes contains a male member with a tapered male thread and a male member with a tapered female thread, with the male member having an end section containing a radial sealing surface and a face section with a shoulder surface, and the female member having a radial sealing surface and a shoulder surface, wherein when the threaded joint is made-up by force, the sealing surfaces come in tight contact with a radial tension and at least a part of the shoulder surface of the male member is in axial contact with the shoulder of the female member. According to the invention, the radial sealing surface of the male member has two consecutively arranged toroidal surfaces which, when in axial contact with shoulders form, together with a mating sealing surface of a female member, two seals with radial tensions d1 and d2 respectively, such that the empirical relationship $$1,0 < \frac{R1 \cdot d1^3}{R2 \cdot d2^3} < 2,0$$

is true, where R1 and R2 are the circle arc radii of toroidal surfaces in cross-section along the pipe axis with a numerical value of at least 10 mm, with shoulders made at a slope angle not exceeding 20° to a normal to the pipe axis, and the sealing surface of a female member contains a portion with a taper from 1:6 to a cylindrical surface.

Some preferred aspects of this invention:
radii R1 and R2 of toroidal sealing surfaces lie in the range from 20 to 80 mm; the axial size of the toroidal sealing surfaces is at least 3 mm and preferably lies in the range from 4 to 8 mm;
the pipe is diametrally precompressed along the length not exceeding 50 mm from the end of the given pipe with the formation of a portion with a taper, equal to or greater than that of a thread, and reduction of the internal diameter of the pipe does not exceed 3 mm;
the thickness of the end section of the male member containing the sealing surface is 60-80% of the wall thickness of the male tubular member;
the radius of the circular arc of the seal located closer to the pipe end is less than the radius of the circular arc of the seal located further from the end of the male member;
the distance from the end seal plane to the center of the first circle is 2-5 mm and the distance from the end seal plane to the center of the second circle is 7-12 mm;
the mating sealing surface of the female member is made up of several conjugated toroidal and tapered areas so that the different tapered areas of the female member with a different or coincident taper from less than 1:6 to the cylindrical surface correspond to the toroidal areas on the male member;
the radial tensions d1 and d2, which satisfy the relationship $$1,0 < \frac{R1 \cdot d1^3}{R2 \cdot d2^3} < 2,0,$$

are chosen so that the circumferential stresses in the end section of the male member containing the sealing surface, are 60-100% of the yield strength of the male member material;
the make-up torque of the threaded joint is so that, upon the joint assembly, the axial stresses in the end section of the male member containing the sealing surface are 50-80% of the yield strength of the material of the male member.

The essence of the second version is as follows.

A threaded joint for oilfield pipes contains a male member with a tapered male thread and a male member with a tapered female thread, with the male member having an end section containing a radial sealing surface and a face section with a shoulder surface, and the female member having a radial sealing surface and a shoulder surface, wherein when the threaded joint is made-up by force, the sealing surfaces come in tight contact with a radial tension and at least a part of the shoulder surface of the male member is in axial contact with the shoulder of the female member. In this case, the radial sealing surface of the male member consists of two consecutively arranged toroidal surfaces with a circular arc profile in cross-section along the pipe axis, which form, together with the mating tapered sealing surface of the female member, two ball-and-taper type seals; the distance from the plane of the end seal to the center of the first circle is 2-10 mm, and the circle arc radii and the distance between the centers of these circles is selected so that when the threaded joint is fully made-up and the joint is bent at an angle of at least 13°/10 m, as well as with internal fluid pressure of up to 100% of the yield strength of the product's material, contact is maintained in the first and second sections of the ball-and-cone type seal.

The specified technical result is achieved due to the fact that pipes for well completion or hydrocarbon production are manufactured with a conical threaded joint containing a thread of a certain profile, an internal stop that after assembly of the joint forms an end seal, as well as internal and external sealing surfaces, the interaction of which after assembly forms two ball-and-taper seals, while the parameters of seals (radii of toroidal portions, amounts of tension, location relative to the end seal) are related with each other.

Relationship between the parameters of seals is determined based on the fact that after assembling the threaded joint, the circumferential stresses in the nose of the male member have a well-defined value, and the level of contact stress in the seals can ensure tightness (operability) of the threaded joint in the most extreme operating conditions.

The required technical result is achieved in two different versions ensuring the relationship between the parameters of ball-and-taper seals; it is either the imposition of constraints on the relationship between the characteristics of the seals (radii of the toroidal portions, amounts of tension, location relative to the end seal), or a combination of characteristics of the ball-and-taper seals arrangement in the design after assembly with the parameters determining the performance of the threaded joint under various load cases.

BRIEF DESCRIPTION OF THE DRAWINGS

The group of inventions proposed for patenting is explained by drawings.

FIG. 1 schematically shows an isometric and a part-sectioned view of a threaded joint.

FIG. 2 schematically shows a plan view of a threaded joint.

FIG. 3 schematically shows a longitudinal section of a part of a male member (pin).

FIG. 4 schematically shows a longitudinal section of a part of a female coupling member (box).

FIG. 5 schematically shows a conditional superimposition of the pin's outer sealing surface and the inner sealing surface of a coupling element after the forced making-up, and also conditionally shows radial tension in the first and second seals.

FIG. 6 shows a picture of equivalent stresses during assembly of a threaded joint with contact only on the second seal.

FIG. 7 shows a picture of equivalent stresses after the forced assembly of a threaded joint with a contact in the first and second seals, as well as in the end seal.

FIG. 8 shows a picture of equivalent stresses for all elements of a threaded joint after the forced assembly of a threaded joint with the optimal make-up torque.

FIG. 9 schematically shows a longitudinal section of a part of the pipe thread element (pin) with the radii of toroidal portions of sealing surfaces and with the dimensions determining the position of the first and second seals.

FIG. 10 schematically shows the shape of the pin nose, which requires the introduction of precompression operation.

DETAILED DESCRIPTION

Figure 1:
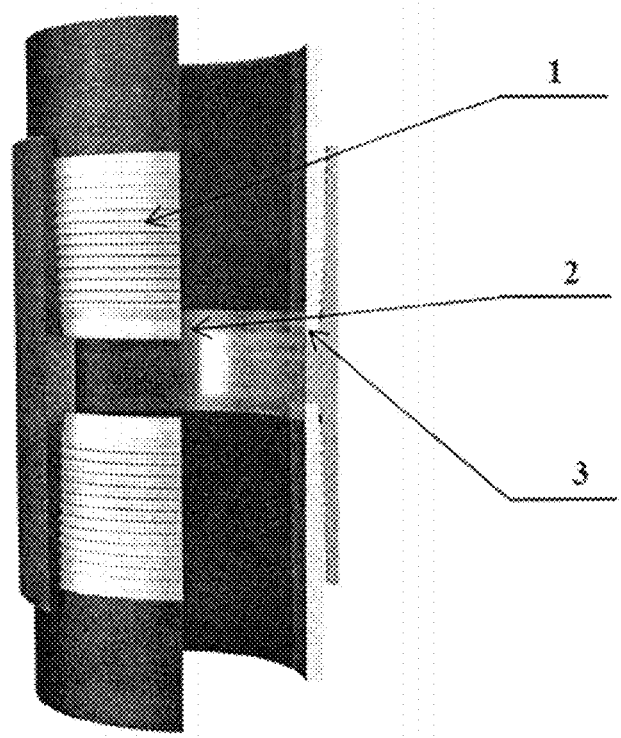
FIGS. 1 to 10 show a threaded joint for casing and tubing strings, individual structural elements of a threaded joint, and various special designs.
Figure 2:
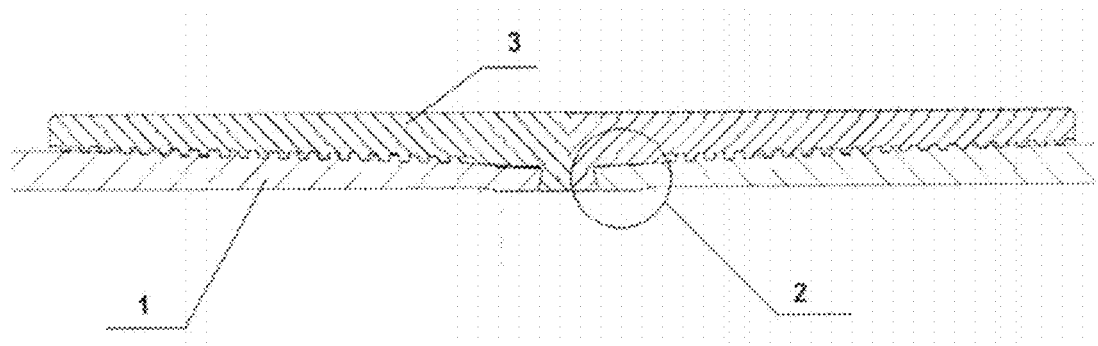
Figure 3:
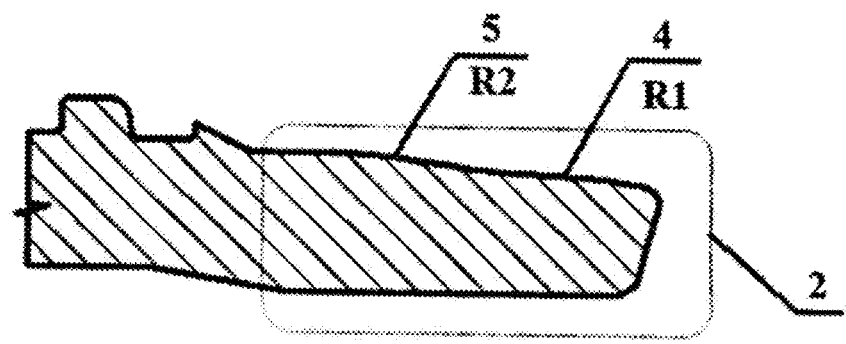
Figure 4:
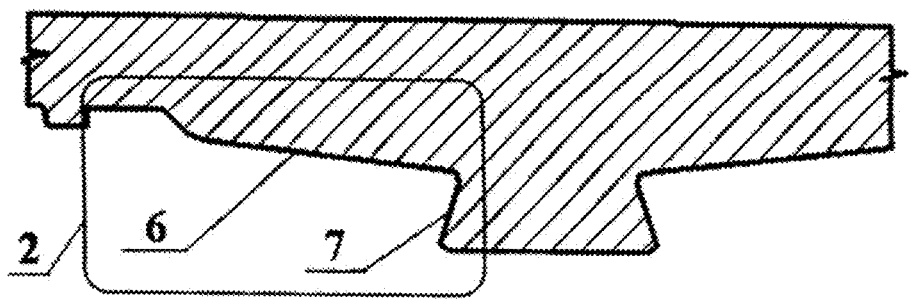

A threaded joint for oilfield pipes (FIGS. 1 and 2) consists of a male member 1 and a female member 3 with conical threads with a non-uniform trapezoidal profile, with a sealing unit marked as position 2 in FIG. 1, 2, 3, 4. So, the specified members 1 and 3 form the following seals:
- two radial seals at the interaction of two portions 4 and 5 (FIG. 3), the outer surface of the pin nose with the mating surface of the box 6 (FIG. 4);
- end seal when the pin face interacts with the mating surface of the box 7 (FIG. 4).

It should be noted that even though authors illustrate the description by box threaded joint as an example, all technical solutions are equivalent for a non-threaded joint when the pipe design provides that one end of a pipe is made in the form of a traditional pin with a male thread, and the opposite end of a pipe—in the form of a socket, i.e. the box pipe end.

Thus, it may be summarized that the technical result provided by the claimed invention is to ensure that the joint remains highly tight under significant multidirectional loads (tensile, compressive, bending, internal and external fluid pressure and their combination), improved make-up characteristics with no or minimized metal scoring on sealing surfaces and threads with multiple make-up and break-up cycles. This technical solution ensures the operational efficiency of pipes with the proposed threaded joint.

The invention proposed by the authors includes some well-known techniques and proprietary innovations to introduce absolutely new performance characteristics intended to further increase tightness and reliability, consequently resulting in a change in the performance of the threaded joint as a whole. Such well-known techniques, first of all, are:
- the use of precompression;
- a special thread profile;
- a special design of the pipe's end pin portion (end sealing surface), including a face end plane's specific slope angle;
- a special radial sealing unit;
- a special shape of the pin nose and grooves in the box.

At the same time, the dimensions of any given structural element and the compression conditions introduced by the authors in this invention serve to further improve tightness and reliability, as well as to achieve high compression, bending, and torque efficiency of the threaded joint.

Figure 5:
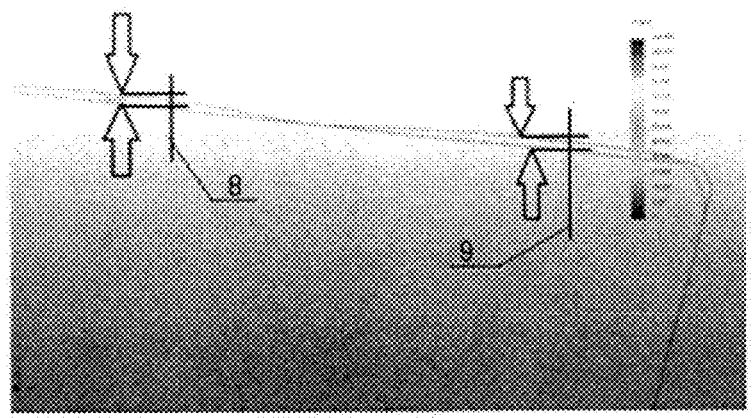

In the Premium-class threaded joint, the sealing unit 2 (FIGS. 1, 2, 3, 4) contains two axially spaced toroidal portions 4 and 5 (FIG. 3) on the male member 1 and at least one tapered portion 6 (FIG. 4) on the female member 3 (box), which, when assembling the joint, form two mutually affecting ball-and-taper seals 8 and 9 (FIG. 5). At the same time, the authors propose to use an empirically derived ratio to calculate the relationship between the radii of sealing "balls" and tension in the corresponding contact surfaces when assembling the joint:

$$1.0 < \frac{R1 \cdot d1^3}{R2 \cdot d2^3} \leq 2.0$$

where R1 and R2 are the radii of the toroidal portions of the sealing surface (FIG. 3), d1 and d2 are the actual values of tension in the first and second seals 9 and 8, respectively (FIG. 5), in the state of forced assembly of the threaded joint (at the moment of contact of the face sealing surfaces).

In this case, the authors suggest that the first seal is located on the side of the stop face (closer to the end of the pipe), and the second seal is located on the thread side.

As a result of verification strength calculations conducted by the authors using finite element methods and full-scale tests of threaded joint samples on test benches, it was found that the satisfaction of this relationship limits the negative impact of "decompression" of sealing surfaces when exposed to adverse load combinations, which allows creating a Premium-class threaded joint with increased characteristics of tightness and reliability.

The reasons for choosing these dependencies are described in detail below.

As shown in patents DE4446806 and WO 2009/060729, the creation of the second support point providing additional contact between the pin surface and the mating surface of the box (the "first" seal of the present invention) allows more complete use of the radial stiffness margin of a long pin. However, in both inventions, the support point works only for a number of load combinations from the full VME circle of the threaded joint. For a particular type of load, there may be a gap at the second support point, either due to irreversible plastic deformation resulting in lower contact pressures or due to reduced radial tension at the support point. As a result, threaded joints both under patent DE4446806 and under publication WO 2009/060729 may have insufficient tightness characteristics for Q1—Q3 cycles: (high compression+high external pressure)— (high tensile strength+high internal pressure). Also, there is the problem of improving the joint's compression, bending, and torque efficiency.

As a result of calculations and experimental work with samples of a threaded joint, authors of the present invention have shown that it is possible to create such threaded joint with the sealing unit comprising two axially-spaced ball-and-taper seals, the first of which is located on the side of a stop face, the second is located on the side of a threaded portion, and both seals retain tightness in the whole VME circle of repeated combined loads. Further research by the authors of this invention has revealed that the joint operation of two interacting seals allows ensuring increased reliability of the sealing unit.

Increased reliability lies in the ability to significantly increase the tightness margin in the sealing unit by means of assembling the joint with an increased radial tension which is 3-4 times greater than the minimum tension ensuring tightness in the joint when exposed to periodic combined loads.

For further explanation, it is proposed to introduce another group of terms in the description that are used by designers of Premium-class threaded joints that will allow full disclosure of the technical essence of the invention.

Geometric radial tension can be defined as half the difference between the outer diameter of the pin and the inner diameter of the box measured in the supporting plane of the seal.

The actual radial tension of the pipe and box elements coincides with the amount of displacement of the outer surface of the pin and the inner surface of the box, respectively, under the influence of forced assembly and external loads and determines the extent of circumferential stresses in the box and the pin.

Effective radial tension of the pin and the box corresponds to the displacement of the pin or box, respectively, under the influence of contact forces in the seal and can be used as a quantitative characteristic of the tightness margin in the seal. Effective radial tension can be defined as the difference between the actual radial tension, i.e. the total displacement of the contact point and the total displacement of this point under the influence of all forces acting on the pin or box except the contact pressure in the seal. However, it is easier to define this type of tension as a product of radial yielding to the radial component of integral pressure corresponding to the transverse force in the theory of thin-walled cylindrical shells. If one of the contact surfaces is tapered, the radial component of the integral pressure is directly proportional to the total value of the integral pressure, and, as is well known from the prior art, this value characterizes the seal tightness margin. The radial displacement of the contact point and the radial yielding of the pin at the seal location can be approximated by methods of applied elasticity theory or more precisely by simulating the operation of a threaded joint using the finite element method.

So, in view of the results of calculations and experimental works with samples of the threaded joint, the authors found that possibility of the above-stated increased tension (3-4 times more than the minimum tension providing tightness) is provided by reducing fluctuations of the effective tension and, accordingly, the tightness margin in the seal, at sequential exposure to combined loads corresponding to a full circle of ultimate loads for a pipe body.

Reduction of effective tension fluctuations is achieved by using a combination of two mutually affecting ball-and-taper seals, which is formed as a result of the interaction of two axially-spaced toroidal portions with two mating tapered portions, characterized in that the seal tensions and radii of toroidal portions satisfy the above-mentioned dependence $$1,0 < \frac{R1 \cdot d1^3}{R2 \cdot d2^3} \leq 2,0.$$

Figure 6:
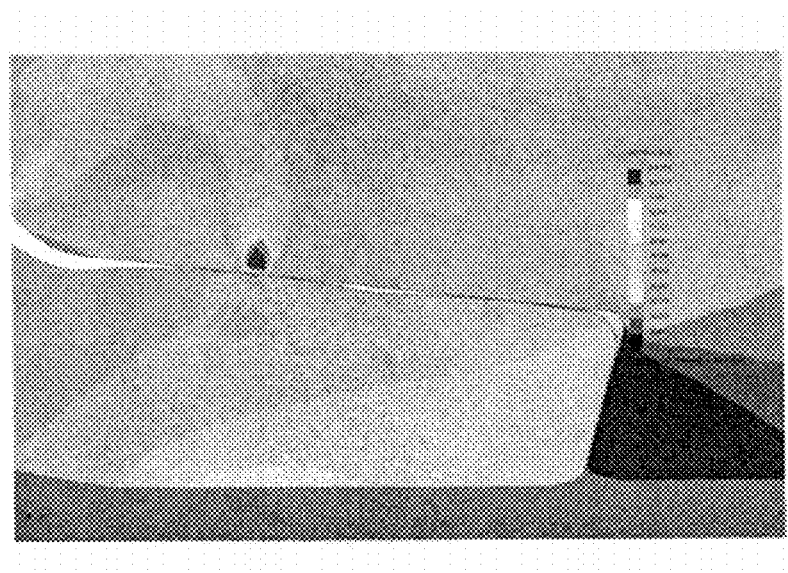
Figure 7:
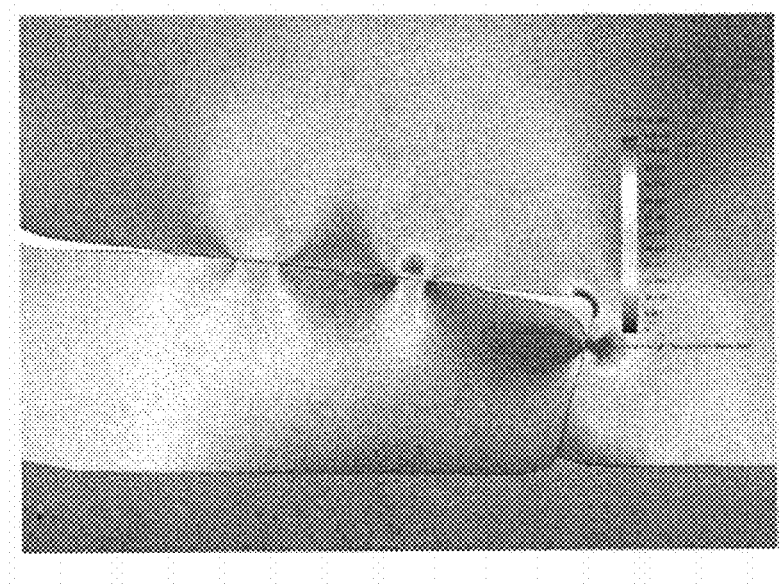
Figure 8:
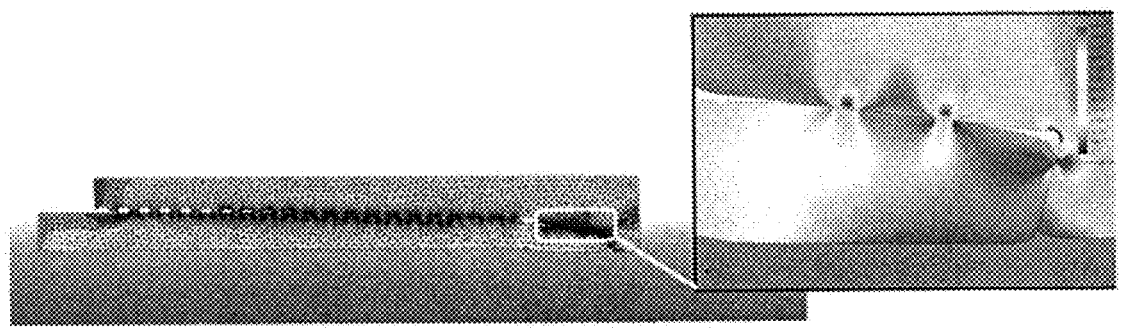

This ratio ensures that at the end of the forced assembly, both seals simultaneously reach the required level of tightness. If the given ratio is less than 1.0 or more than 2.0, one of the seals is underloaded with respect to the other, as a result, when the combined load is applied in a decompressed seal, a gap may occur—examples of such cases are shown in stress diagrams:

in FIG. 6, the second seal is overloaded, and there is a gap in the first seal;

in FIG. 7, the first seal is "overloaded" and the second seal is "underloaded"—the contact pressure level in the second seal is insufficient to ensure tightness over the entire operating load range;

in FIG. 8, both seals are loaded uniformly, and the contact pressures in the first and second seals are approximately the same.

An extra advantage of the two-seal design is the creation of additional support addressed in patents DE4446806, WO 2009/060729, which limits the bending of the long nose under the action of combined loads due to the restriction of displacement of the pin end towards the outer surface, as well as the increase of the compressive load efficiency addressed in patents EA008078, WO 2009/060729 through the use of a pin nose of high radial rigidity and low axial rigidity in which the displacement of the nose end is limited both in the direction of the inner surface and outer surface.

However, patent documents WO 2004/109173, DE4446806, and WO 2009/060729 do not consider the effect of the interaction of two seals on the amount of effective tension in each seal under combined loads. The proposed principle of limiting the fluctuations of the effective tension to increase the total achievable tightness margin of the threaded joint is new in relation to the prior art.

When the system has two seals on the pin nose, each of which creates a certain geometrical tension, an increase in the total integral pressure (compressive force of the pin nose from the sealing surfaces) is achieved due to more uniform radial compression of the pin. When a radial tension is created in a two-seal system, the seals influence each other. The actual displacements of the contact point of each of the seals consist of the displacement of that point under the influence of tension in the other seal and the effective tension created by the contact force in the seal itself. This results in a redistribution of the total force of the pin compression between two seals. If some combination of loads results in a partial deflection of the pin nose—external forces acting on the threaded joint cause such displacement of the outer surface of the pin nose and the box mating surface that the effective tension determined without taking into account the interaction of the seals is reduced—then the change of effective tension in each seal with regard to the interaction between seals is reduced by an amount corresponding to the displacement of the contact point due to the change of tension in the other seal.

As a result, in a system of two interacting seals, the fluctuations of the effective tension are reduced, which allows for ensuring tightness over the entire range of combined loads with a lower geometric tension. The difference between the extreme tension from the working condition in the elastic area and the minimum tension ensuring a tightness increases, as a result, the joint can be assembled with an increased tightness margin. Accordingly, such a joint has better sealing and reliability characteristics than the Premium-class joints known from the prior art.

However, the mechanism described works only if the contact in each of the seals is maintained at all possible load combinations. It is preferable that the tightness margins of the first and second seals coincide implying that maximum tightness performance is achieved by both seals when assembling the joint. Thus, ensuring certain geometric characteristics of the outer and inner sealing surfaces (radii of toroidal portions, location of toroidal portions relative to the pin end, location of the box mating sealing surface during assembly of the joint) allows obtaining the planned technical result.

It is known from the prior art that the tightness margin in a single ball-and-taper seal is determined by the value of the integral pressure, which in turn depends on the actual radial tension in the seal.

Tightness is ensured when the following conditions are met:
the contact length is at least 1 mm, preferably 1.5-3 mm;
the average pressure on the contact surface is greater than the retained pressure, the ratio of the average contact pressure to the retained fluid pressure is preferably 4-10;
the maximum contact pressure does not exceed the yield strength more than twice; the maximum contact pressure is preferably 80-160% of the yield strength.

The minimum tightness level (tightness margin is equal to 1) corresponds to the 1-mm-long contact and the fluid pressure equal to the average contact pressure. An increase in the contact length and the ratio of the average contact pressure to the retained fluid pressure results in an increased tightness margin.

The maximum tightness margin is ensured by a correct selection of the toroidal portion radius. Increasing the radius at a fixed value of tension increases the size of the contact area and reduces the average and maximum contact stresses. Too small radius results in an insufficient contact tightness due to the short contact area. Too large radius results in insufficient contact tightness due to low contact pressures.

Another feature of the ball-and-taper seal located at the end of the male member is the displacement of the contact surface when assembling the joint. Consequently, the axial dimension of the toroidal area should be larger than the required contact area size due to the tightness condition.

When implementing the invention, additional factors ensuring the necessary performance of the threaded joint must be taken into account. First of all, the anti-scoring properties allow multiple assembly and disassembly of the threaded joint. The anti-scoring properties of the seal, as well as the interaction of two ball-and-taper seals presented in the invention, are affected (as explained above) by radii and tension in the seals. If a seal radius under 10 mm, there is a high risk of scoring in the seal. Besides, it is necessary to ensure that there is no scoring in the threads as well as on the shoulder when assembling the high make-up torque joint. It is also necessary to use techniques aimed at improving the reliability of the joint under the action of external pressure, compressive load, high make-up torque, and bending.

As the authors found in their research, tapered portions of the radial seal can be located both on the female member (box/box pipe end) and on the male (pin) member. In other words, if there is a tapered sealing surface at the box end, then the pin sealing surface contains two toroidal portions and vice versa. It should be noted that, from the point of view of the manufacturability of a threaded joint (threading) and simplification of its measurement and control, it is advisable to give preference to toroidal portions on the pin part of the pipe.

At the same time, in a number of experimental works when developing a threaded joint, the authors found that the most optimal tapering of the sealing element should not exceed 1:6 (i.e. from a simple cylinder to a cone with a tapering of 1:6). Portions with a tapering greater than 1:6 reduce the end surface (resulting in a very thin nose), which is undesirable from the point of view of ensuring high reliability under compressive loads, bending, and excessive torque.

In this case, the most effective solution for ensuring optimal tension in the seal is the proposed solution for the geometry of the box shoulder (FIG. 4, item 7)— it is preferable to design it with a reverse flank angle from minus 10° to minus 20°. A stop face with an angle less than minus 10° reduces the precompression effect in the axial making-up of the joint, which lessens the tightness margin in the first seal and reduces the reliability of the threaded joint. Also, the insufficient reverse angle of the shoulder decreases the wedge effect preventing the opening of sealing surfaces under the action of external pressure by limiting radial displacement of the pin nose to the pipe axis. The wedge effect also allows further reducing the fluctuations in the effective tension in the seals under the action of repeated combined loads. A shoulder with an angle greater than minus 20° reduces the strength of the box shoulder due to a decrease in its thickness, which consequently cannot act as a limiter of radial movement of the end of the pipe element to the pipe axis.

Figure 9:
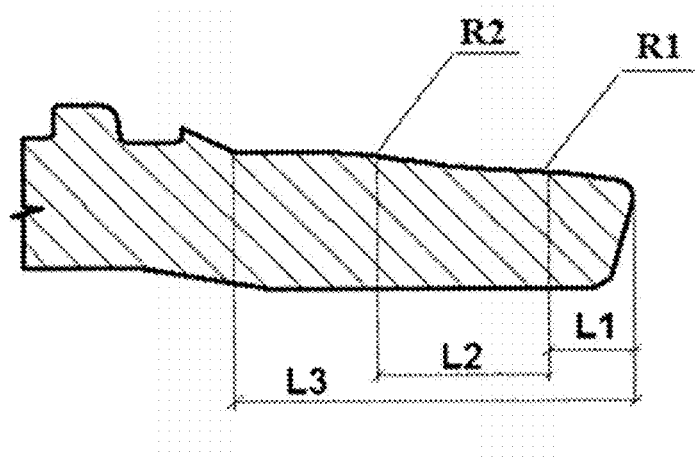

Besides, the research carried out by the authors of the proposed technical solution (verification calculations and full-scale tests of samples of the threaded joint) found that the placement of ball-and-cone type seals in the sealing unit (shown in FIG. 9) is rather important for maintaining tightness: the distance from the pipe end to the first toroidal portion L1, the distance between toroidal portions L2, and the distance from the thread of the pipe end L3.

As a result, it was found that the distance from the thread to the stop face on the pipe element should not exceed half of the edge effect affected area. The size of the affected zone is determined in the theory of thin-walled shells and is equal to the distance at which deflections caused by displacement at a given point decrease by 23.4 times. This nose is shorter than the one provided for in patent DE4446806, which ensures a more uniform radial compression of the nose by a two-seal system. To achieve the best sealing properties, it is preferable that the nose length increases with increasing diameter and wall thickness in accordance with the increase in the size of the edge effect area. This effect is associated with the previously given descriptions and is linked by a single concept with the group of inventions obtained in this case since it aims at achieving the same technical result.

Calculations made by the authors of the proposed technical solution show that the preferred distance from the first sealing point to the pin nose end is 2-10 mm. This distance is significantly less than for the invention under patent DE4446806 and slightly more than for the invention under patent document WO2009/060729. If this distance is less than 2 mm, the effect of precompression during axial making-up is significantly increased, which can lead to scoring, either in the first seal or in the shoulder. If this distance is greater than 10 mm, the precompression effect is significantly reduced, resulting in a reduced tightness margin in the first seal and reduced centering characteristics of the second seal using the "first-seal-stop-shoulder" system. In this case, the circular arcs radii (corresponding to toroidal portions in cross-section) and the distance between the centers of these circles are selected so that when the threaded joint is fully made-up and the joint is bent at an angle of at least 13°/10 m and the internal fluid pressure is present, the contact is maintained on the first and second ball-and-taper seals—i.e. that, as in the described above case of the first group of inventions, the threaded joint remains operational at various combinations of loads during operation. The calculations showed that the radii of circular arc for different threaded joint sizes and strength groups should preferably be selected in the range from 20 to 80 mm. This choice ensures the simultaneous retention of the contact between the first and second seals and the size of the contact area in each seal required under tightness conditions, as well as limits the displacement of the contact area during assembly of the joint and the effect on it of various combinations of loads.

For the radius of the toroidal portion in the range from 20 to 80 mm, the size of the contact area is 2-3 mm. To prevent the contact area from leaving beyond the toroidal portion, its axial size should preferably lie in the range from 4 to 8 mm.

For design reasons, it is preferable that the distance from the first sealing point to the pin nose end is 2-5 mm. In this case, placing two interacting ball-and-taper seals of the necessary length on the pin nose conditions the location of the point of the second seal at a distance of 7-12 mm from the plane of the end seal.

Figure 10:
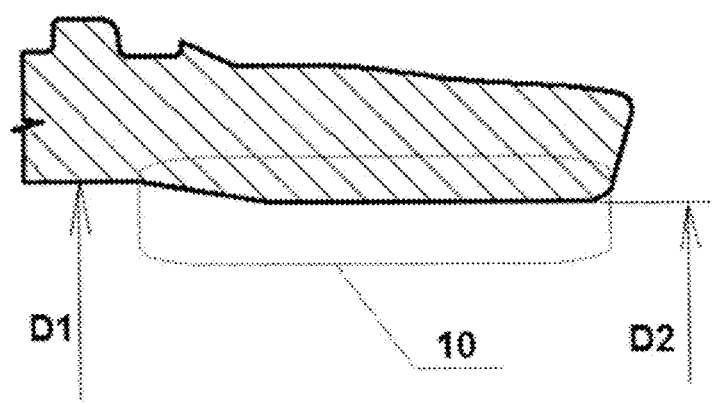

The design of a two ball-and-taper sealing unit proposed in this invention should preferably be cut on the pipe workpiece after reducing the pipe end with additional machining of the inner surface of the pin nose. FIG. 10, item 10 shows the area of compression and additional machining. Moreover, the reduction should allow for making a pin nose with an inner diameter D2 under the first and second seals 0-3 mm less than the nominal inner diameter of the pipe D1 (FIG. 10). Ensuring the inner diameter corresponding to or slightly larger than the nominal pipe diameter allows ruling out the influence of geometric deviations of the workpiece on the performance of the joint. If the pipe inner diameter is reduced as a result of compression by more than 3 mm, it may prevent the necessary process operations inside the pipe during field development (pigging, geophysical surveys, etc.). Compression increases the radial stiffness of the pin, which improves the tightness and reliability of the threaded joint. The use of compression in conjunction with machining allows ensuring an internal flush surface of the threaded joint, which improves the flow conditions inside the pipe.

Increasing the radial size of the shoulder to 60% of the pipe wall thickness or higher is an additional advantage of compression. This increase is not possible for a threaded joint under patent DE4446806. A pin nose with more than 60% of the pipe wall thickness improves the tightness of the joint as well as the compression and torque efficiency. A sealing unit designed in accordance with this invention, together with the precompression of the stop end of the workpiece allows achieving 100% compression efficiency of the threaded joint.

Besides, it is preferable that the compression is performed with a tapering equal to or greater than the tapering of the thread. Compression with this tapering improves the use of the workpiece material and reduces the load on the threaded tool when threading the pipe element. However, compression can also be performed to obtain a cylindrical portion.

In another particular case, the thread profile can be made in such a way that roots and tips of the thread tooth are parallel to the pipe axis, and gaps on the embedded faces are minimal when the joint is designed to work in compression with a force of at least 100% of the nominal yield strength of the pipe material, or roots and tips of the turns are parallel to the axis of the thread for the condition, and gaps on the embedded faces are increased when the joint is designed to work in compression with a force of 60-100% of the nominal yield strength of the pipe material.

The reasons for this choice of characteristics in this special case of the technical solution are as follows: with a gap of less than 0.15 mm between the embedded faces, compression of the threaded joint can result in partial contact on the embedded faces and the compressive force begins to spread not only on the end surface of the seal but also on the tooth flanks—the guiding faces. In other words, the nose is unloaded—when compressive loads are applied to the threaded joint due to structural gaps in the thread, the end sealing unit is first loaded (elastic deformation). In this case, the applied compressive loads must not exceed such contact stresses when irreversible plastic deformations start to occur in the end sealing unit. The applied compressive loads may increase if, in addition to elastic deformation of the end sealing unit, the flanks of the thread tooth are geared at a certain stage, so that the load from compressive stresses is distributed to the stop sealing unit and the flanks of the thread. The smaller the gap between the embedded faces, the earlier the interaction along the guide faces begins, and, consequently, the higher the compression performance of the joint.

Calculations by the finite element method and subsequent prototypes made-up with various torques (which respectively provide certain contact stresses on the surface of the end sealing unit) showed that under loads up to 100% of the yield strength the metal of the face seal surface is in the area of elastic deformation, which ensures the absence of plastic deformation of the threaded joint in this seal and, accordingly, ensures the preservation of performance of the entire structure as a whole.

However, in some cases, it is necessary to have an increased gap along the guide faces to simplify the threaded joint manufacturing procedure. In this case, the compression efficiency of a threaded joint can be 60-100% of the nominal yield strength of the pipe material, depending on the joint design.

From the prior art, it is known that the performance of a threaded joint also depends on its correct assembly. The authors of the invention propose to follow the following requirements when choosing the assembly conditions for a highly reliable threaded connection of casing and tubing strings:

1. When assembling the joints, the radial tensions in the first and second seal shall be selected so that the circumferential stresses at the end of the male member containing the sealing surface are 60-100% of the yield strength of the male member's material. This increases the reliability of the threaded joint. Particularly, it provides the maximum tightness margin when assembling the joint, without affecting the working conditions of the seal in the elastic area. Combined loads may reduce the tightness margin. The use of a system of two interdependent ball-and-taper seals, characterized in that the seal tensions and radii of toroidal $$1,0 < \frac{R1 \cdot d1^3}{R2 \cdot d2^3} \leq 2,0,$$

portions satisfy the dependencies allows limiting this reduction. As a result, with the worst combination of loads, the maximum effective tension in each of the seals and, consequently, a high margin of seal tightness, in general, are ensured.

2. The make-up torque used to assemble the threaded joint shall be selected so that after assembly of the joint, the axial stresses in the end section of the male member containing the sealing surface are 50-80% of the yield strength of the male member's material. This amount of torque prevents plastic deformations when acting on the threaded joint of the compressive load and opening the mechanical seal under tension. Besides, this amount of the make-up torque limits the effect of the seal release by the external pressure. This consequently ensures the minimum drop of effective tension and associated tightness for the system of two interdependent ball-and-taper seals characterized in that the tension of seals and radii of balls satisfy the dependencies $$1,0 < \frac{R1 \cdot d1^3}{R2 \cdot d2^3} \leq 2,0,$$

thus increasing the reliability of the threaded joint.

It should be noted that high gas-tightness of the system of two interdependent ball-and-cone type seals characterized in that the seal tension and radius of toroidal portions satisfy dependencies $$1,0 < \frac{R1 \cdot d1^3}{R2 \cdot d2^3} \leq 2,0,$$

allows using threaded joints assembled with both reduced and increased make-up torque. The difference between the make-up torque and the optimal one (increased or decreased) reduces the tightness margin in the seal with the worst combination of loads. However, even a reduced tightness margin is sufficient to ensure the operability and gas tightness of the joint over the entire range of combined loads corresponding to 100% of the maximum load on the pipe body in terms of the von Mises equivalent.

The above description of the specific implementation of the invention shows that the competence of an expert in this technology is sufficient to design a threaded joint containing a seal from a system of two interdependent ball-and-taper seals characterized in that the seal tension and the radii of the toroidal portions satisfy the dependencies $$1,0 < \frac{R1 \cdot d1^3}{R2 \cdot d2^3} \leq 2,0,$$

featuring 100% efficiency and high reliability.

Finite element calculations and subsequent prototypes made-up with various torques (which respectively provide certain contact stresses on the surface of the end seal) have shown that the proposed seal works in the area of elastic deformation in the entire range of combined loads corresponding to 100% of the ultimate load on the pipe body in terms of the von Mises equivalent and provides increased gas tightness of the threaded joint.

The threaded pipe joint containing two radial ball-and-taper seals and the end seal, proposed by the authors, is manufactured industrially using common metalworking technologies applied in the production of tubing and casing strings, both in pilot production of a large number of threaded joints for testing and research and in the industrial production development.

Thus, summarizing two versions of the technical solution offered by the authors, that result in the achievement of the claimed technical result (Premium-class threaded joint for casing and tubing strings with the maximum possible tightness and improved reliability for the widest range of operating loads, including bending, compressive, combined and cyclic loads, and preserves its performance after repeated assemblies and disassemblies), allows briefly formulating the main parameters of the two proposed versions producing identical functional results.

This is a tapered threaded joint with certain geometrical characteristics of the thread with ball-and-taper seals formed by the interaction of two sealing surfaces, one of which contains two toroidal portions and the other has mating tapered portions, which have certain interrelated geometric parameters (radii of toroidal portions and the amounts of geometric tension in the seal, the distance from the pin end to the centers of circles corresponding to toroidal portions). At the same time, all the most important geometrical parameters of the joint are calculated in such a way as to ensure a certain level of circumferential stresses in the male and female members, and such contact pressures in the seals that the threaded joint remains operational under the most extreme operating conditions:

the shoulder is located at an angle maximum 20° to the normal to the pipe axis, the toroidal portions should have radii of at least 10 mm, and the mating tapered sealing surface has a certain tapering (from less than 1:6 to the cylindrical surface) with the relationship of the radii of the toroidal portions corresponds to the ratio $$1,0 < \frac{R1 \cdot d1^3}{R2 \cdot d2^3} < 2,0$$

(d1 and d2—radial tensions in the seal);

the radii of the circles corresponding to toroidal portions and their positioning relative to the pin face are interrelated according to the following principle: the distance from the face seal plane to the center of the first circle is 2-10 mm, and the radii of the circular arcs and the distance between the centers of these circles are calculated from the conditions for retaining the contact in the first and second ball-and-taper seals under the following operating conditions: bending the joint at an angle of at least 13°/10 m and inner fluid pressure up to 100% of the yield strength of the material.

The invention claimed is:

1. A threaded joint for oil pipes containing a male member with a tapered male thread and a female member with a conical female thread, where the male member has an end section containing a radial sealing surface and an end section with a shoulder surface, and the female member has a radial sealing surface and a shoulder surface, with forced making-up the threaded joint the sealing surfaces coming into a tightly sealed contact with a radial tension and at least part of the shoulder surface of the male member being in axial contact with the shoulder of the female member, the radial sealing surface of the male member being made with two consecutively arranged toroidal surfaces, the two consecutively arranged toroidal surfaces, when in an axial contact between the shoulders of the male and female members, forming, together with the radial sealing surface of the female member, two seals with radial tensions d1 and d2 respectively, such that an empirical relationship $$1,0 < \frac{R1 \cdot d1^3}{R2 \cdot d2^3} < 2,0$$

is satisfied, where R1 and R2 are radii of circular arcs of the two consecutively arranged toroidal surfaces in a cross-section along a pipe axis of the oil pipes, the radii being at least 10 mm, and the shoulders being made with a slope angle less than 20° to a normal to the pipe axis, and the radial sealing surface of the female member contains a portion with a tapering from 1:6 to a cylindrical surface.

2. The threaded joint according to claim 1, wherein the radii R1 and R2 of toroidal sealing surfaces lie in the range from 20 to 80 mm.

3. The threaded joint according to claim 2, wherein a size of the toroidal sealing surfaces, in an axial direction, is from 4 to 8 mm.

4. The threaded joint according to claim 1, wherein an internal diameter of a given oil pipe of the is oil pipes has been reduced along a length of under 50 mm from an edge of the given oil pipe, thereby forming a tapered portion of the given oil pipe, the tapered portion being equal to or greater than the conical female thread, the internal diameter of the given oil pipe having been reduced by no greater than 3 mm.

5. The threaded joint according to claim 1, wherein a thickness of the end section of the male member containing the radial sealing surface is 60-80% of a wall thickness of the male member.

6. The threaded joint according to claim 1, wherein a radius of a circular arc of a respective one of the two seals located closer to an end of the male member is less than a radius of an other circular arc of an other one of the two seal located further from the end of the male member.

7. The threaded joint according to claim 1, wherein a distance from an end seal plane to a center of a first one of the circular arcs is 2-5 mm and a distance from the end seal plane to a center of a first one of the circular arcs is 7-12 mm.

8. The threaded joint according to claim 1, wherein the radial tensions d1 and d2, which satisfy the empirical relationship $$1,0 < \frac{R1 \cdot d1^3}{R2 \cdot d2^3} < 2,0$$

are chosen so that circumferential stresses in the end section of the male member containing the radial sealing surface, are 60-100% of a yield strength of a material of the male member.

9. The threaded joint according to claim 1, wherein a make-up torque of the threaded joint is chosen so that after assembly of the threaded joint, axial stresses in the end section of the male member containing the radial sealing surface are 50-80% of a yield strength of a material of the male member.

* * * * *